(No Model.)
R. MULHOLLAND.
VEHICLE SPRING.
No. 347,500. Patented Aug. 17, 1886.
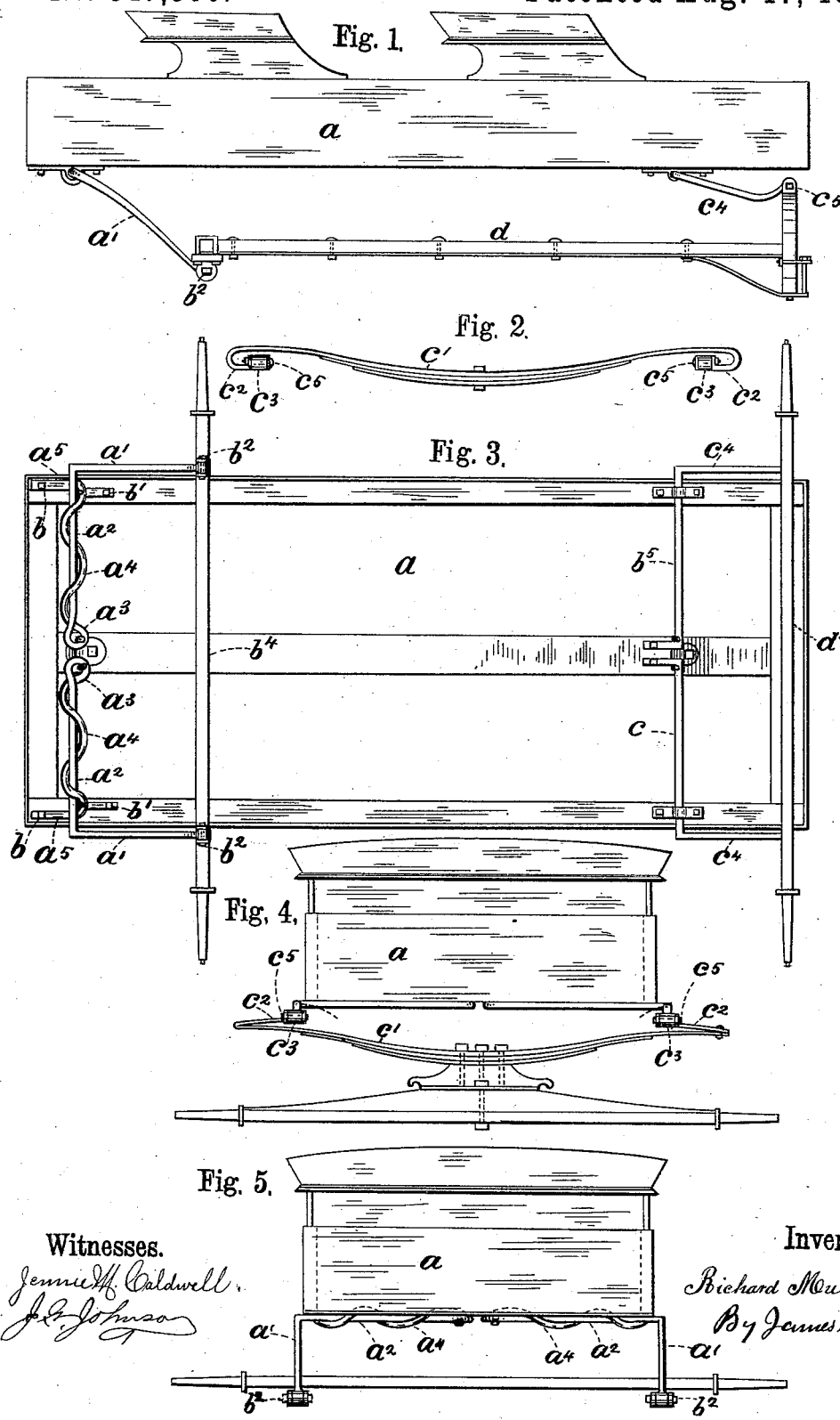
Witnesses.
Jennie M. Caldwell
J. C. Johnson
Inventor.
Richard Mulholland.
By James Sangster
Atty.

UNITED STATES PATENT OFFICE.

RICHARD MULHOLLAND, OF DUNKIRK, NEW YORK.

VEHICLE-SPRING.

SPECIFICATION forming part of Letters Patent No. 347,500, dated August 17, 1886.

Application filed October 12, 1885. Serial No. 179,653. (No model.)

*To all whom it may concern:*

Be it known that I, RICHARD MULHOLLAND, of Dunkirk, in the county of Chautauqua and State of New York, have invented certain new and useful Improvements in Vehicle-Springs, of which the following is a specification.

The object of my invention is to produce in a vehicle a vehicle-spring combining the principle of a torsion and a spiral or coiled spring. My invention relates, further, to the arrangement and construction of the outer arms of the same or torsion springs, and their combination with the semi-elliptic leaf-spring to the end of the vehicle, whereby provision is made for the lengthening and shortening movement, produced by the downward and upward action of the body of the vehicle when in use, without the necessity of links or other intermediate shackles or couplings, as heretofore used, all of which will be fully and clearly hereinafter shown, described, and claimed by reference to the accompanying drawings, in which—

Figure 1 is a side elevation of the body and a portion of the running-gear of a vehicle, showing a similar view of my invention connected thereto. Fig. 2 represents a modified form of the semi-elliptic spring. Fig. 3 is a bottom view of the body and a portion of the running-gear of a vehicle, showing a similar view of my invention. Fig. 4 is a front end view of the same. Fig. 5 represents a back end view.

The body of the vehicle $a$ may be made in any well-known way. The rear springs are continuous rods or bars bent in the form shown in Fig. 3, and consist of a vibrating arm, $a'$, a straight arm, $a^2$, bent into a loop form, $a^3$, and coiled spirally around the straight portion $a^2$, as shown by the spiral coils $a^4$, and having the short rigid arm $a^5$, by which it is secured to the body of the vehicle in any well known way—for instance, by journal-bearings, hook-fastenings, and bolts, as shown at $b\ b'$. The outer ends of the arms $a'$ are made with eyes to receive a bolt, $b^2$, which pivotally connects said arms with the axle $b^4$ of the vehicle.

$b^5\ c$, Fig. 3, are torsion-springs, which are made and attached to the body of the vehicle in the usual or well-known way.

$c'$, Figs. 2 and 4, represents a semi-elliptic spring having formed or attached to its ends the inwardly-projecting extensions $c^2$, having the perforated portion $c^3$, to which the outer ends of the arms $c^4$ are pivotally attached by the bolts $c^5$, thereby connecting the torsion-springs $b^5\ c$ with the semi-elliptic spring $c'$. The inwardly-extending portions or springs $c^2$ must be made of a proper length and proportion, so that when the springs $b^5\ c$ are connected and weight applied to the body of the vehicle the elasticity obtained from the extensions will be equal to the action at the ends of the semi-elliptic springs and will hold the outer ends of the arms $c^4$ on a horizontal line, as shown.

The object in thus combining the torsion-springs with the semi-elliptic spring at one end of the vehicle is to make the elasticity at that end equal to the elasticity of the combined torsion-spring $a^2$ and spiral springs $a^4$ at the opposite end; besides, the spiral and combined torsion-springs take up less room and allow more space for the springs to act between the body and the axle, which is sometimes an advantage where the rear end of the body extends over the rear axle. By this means what are known as "shackles" or "double couplers" or "clips" are dispensed with, and the outer arms of the torsion or similar springs may be attached directly to the semi-elliptic spring without any intermediate connection, thereby reducing the number of joints. Consequently there is a less number of parts liable to get out of order, and less tendency to rattle, and, furthermore, it makes a softer and easier spring.

It will be observed that the outer arms, $a'\ c^4$, Fig. 1, of the front and rear springs are inclined in a forward and downward direction in a line with the length of the body of the vehicle. By this construction and arrangement of springs the outer arms, $a'\ c^4$, of each pair will be of the same length, and therefore the vibration of said arms at each side of the vehicle will be equal and the load will be carried in an even or level manner. The said arms $a'\ c^4$ being pivotally attached directly to the axles or bolster, side bars or side springs, as heretofore used, are dispensed with, and said arms may be of any required length. The body may therefore be any required height above the points of suspension $b^2\ c^5$ without requiring at said points any intermediate links or joints to allow for the projection of said arms $a'\ c^4$, as required by the construction heretofore commonly used where the outer ends of the said arms, $a'\ c^4$, are inclined in opposite directions, or point one toward the front and the other toward the rear. By this arrangement of the outer arms of the springs, $a'\ c^4$, Fig. 1, the body of the vehicle $a$, when loaded, will be projected downward and toward the rear, and the arms $a'\ c^4$ will swing at their centers or points of attachments $b^2\ c^5$ with the body in the same direction. As no intermediate links are required, the body of the vehicle $a$ will not have the objectionable swinging motion common to other constructions.

The arms $a'\ c^4$, Fig. 1, may have different downward inclinations and be of different lengths, thereby regulating the degree of elasticity, as the nearer said arms $a'\ c^4$ are inclined from a perpendicular line the stiffer the spring will be, and the longer they are and greater the inclinations the more elasticity the springs will have, and heavier rods or bars may be used.

In Fig. 1 I have shown the outer arms, $c^4$, of the front springs connected to a leaf-spring, $c'$; but the said spring $c'$ may be dispensed with, and the springs $b^5\ c$ will do good service by attaching the outer arms, $c^4$, to a bar or support resting on top of the axle instead of the spring $c'$, or to the front axle in the same manner as the rear springs are attached to the rear axle; but in the latter case provision must be made to permit the vehicle to be turned without disturbing the relative position of the said springs $b^5\ c$ with the axle $d'$ when connected with the same, which may be done by pivoting the reach $d$ at or near the longitudinal center of the axle $d'$ and attaching the springs $b^5\ c$ to a platform, and a pair of connections pivoted and secured at or near the front of the body $a$, in a manner now well understood.

I claim as my invention—

1. A vehicle-spring consisting of a continuous rod or bar forming the members $a^2\ a^4$, one of which is spirally coiled or looped around the other and having the vibrating arm $a'$ and the rigid arm $a^5$, substantially as shown and described.

2. A combined semi-elliptic and torsion spring at the front of the vehicle, consisting of the springs $b^5$ and $c$, having their ends secured to the body of the vehicle, and having their arms $c^4$ pivoted by pivots $c^5$ to the semi-elliptic spring $c'$, secured to the front axle, in combination with a reach for securing the axles in position, and the combined spiral and torsion springs $a^2\ a^4$, the torsion-springs having their arms $a'$ pivoted to the rear axle, and the spiral springs having their fixed ends secured to the body, substantially as described.

3. In a vehicle, the combination of the body, the reach, and axles with the within-described springs, having their outer arms, $a'\ c^4$, arranged lengthwise of the body in the same direction, the arms $a'$ being pivotally connected directly to the axle $b^4$, and the arms $c^4$ being connected pivotally to the spring $c'$, or to a bolster or support, for the purposes described.

RICHARD MULHOLLAND.

Witnesses:
 GEO. A. FRENCH,
 EDWIN ISHAM.